April 7, 1931.  H. H. CHESNY  1,799,354
CARBONATING APPARATUS
Filed Jan. 21, 1929
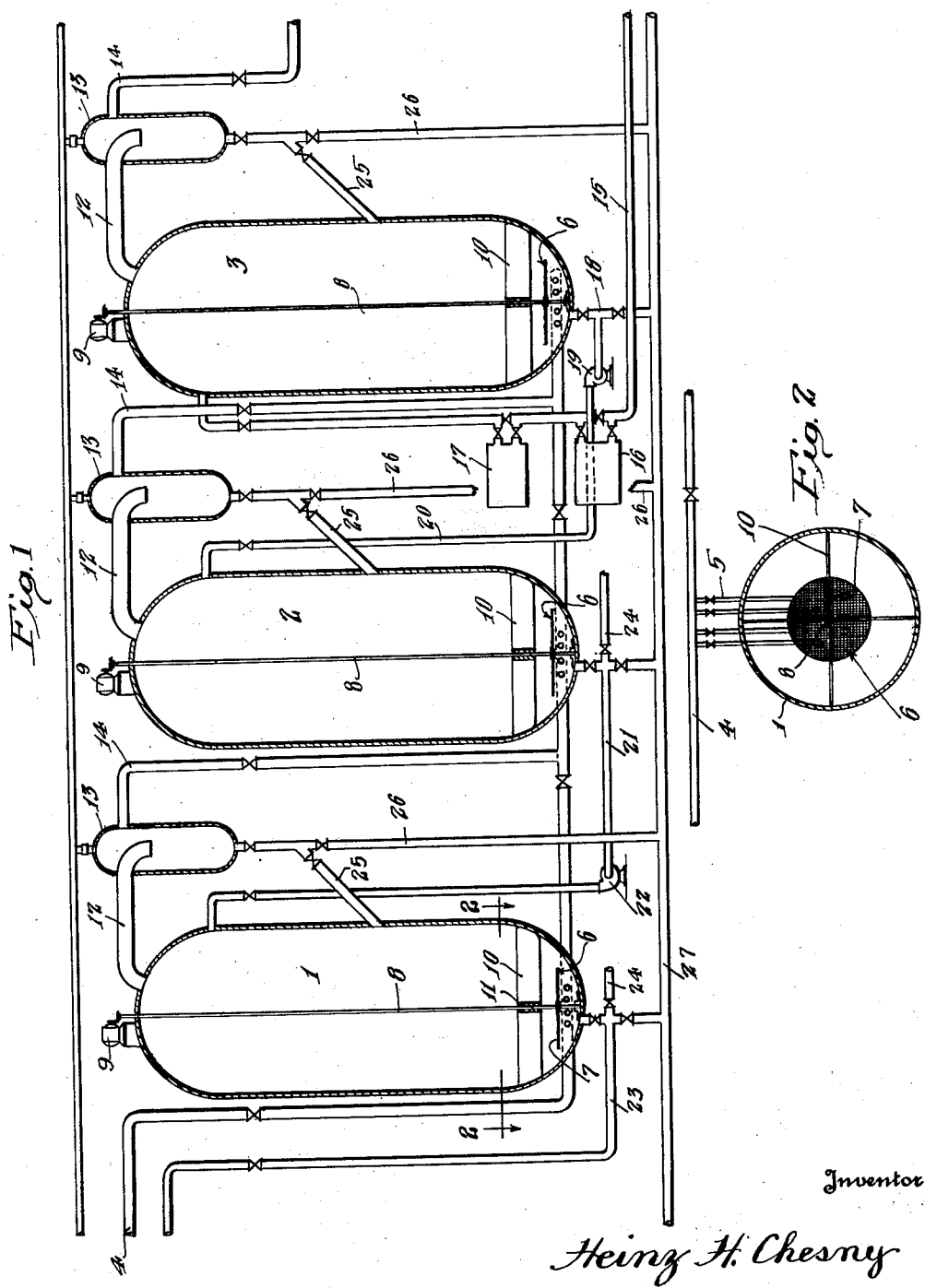
Inventor
Heinz H. Chesny
By Lyon & Lyon
Attorneys Patented Apr. 7, 1931

1,799,354

UNITED STATES PATENT OFFICE

HEINZ H. CHESNY, OF LOS ANGELES, CALIFORNIA

CARBONATING APPARATUS

Application filed January 21, 1929. Serial No. 333,985.

This invention relates to an apparatus for treating salt solutions especially alkaline brines, with carbon dioxide bearing gas to obtain sodium bicarbonate.

Heretofore it has been the general practice in carbonating solutions to use tall towers, usually from 60 to 90 ft. in height and 5 to 7 ft. in diameter, in which the gas is passed in at the bottom and the liquor passed in near the top. The towers are generally provided with diaphragms or baffle plates to obtain a distribution and redistribution of the gas in the liquor. These absorption towers are very inefficient especially in the case of carbonating saline liquors containing sodium carbonate. The reaction between the carbon dioxide gas and the sodium carbonate proceeds very slowly under the physical conditions obtained in these towers.

The exit gases from the towers are high, the gas carrying often as high as 18 per cent carbon dioxide, which is lost in the atmosphere. Another disadvantage of the apparatus described lies in the difficulty or impossibility of obtaining the proper temperature conditions through the liquid column as considerable heat is liberated in the reaction between the gas and liquor, causing a rise in temperature to take place. A further rise of temperature is experienced due to the heat of crystallization of the precipitating alkali.

It is the primary object of the present invention to provide an apparatus for treating salt solutions with carbon dioxide bearing gas in which the efficiency of the reaction may be increased to give a higher rate of reaction and to provide an apparatus in which the desired carbonating reaction may be carried out with a lower loss of the valuable carbon dioxide gas in the exit vapors, and to further provide an apparatus in which the temperature of the solution and partial pressures of the gas throughout the treating operations may be controlled, as desired, to give a more efficient yield of a more desirable product.

As pointed out in my copending application "Process of forming sodium bicarbonate", filed January 21, 1929, Serial No. 333,986, the precipitation of sodium bicarbonate from alkaline solutions by carbon dioxide may result in various products, depending upon the control of the conditions of treatment.

It may be stated generally that where the temperature of treatment of the solution is permitted to fall below 46° C., crystals of sodium bicarbonate are precipitated of such size and shape that they hold, on filtration or centrifugation, a large moisture content resulting in an impure product. This is true not only where the temperature of the solution is maintained below 46° C. during the actual precipitation of the bicarbonate, but is also true when the temperature of the solution is maintained below 46° C. during the operations of saturating the solution with bicarbonate, and before any actual precipitation takes place. Apparently, when the solution is carbonated to saturate the same in bicarbonate at temperatures below 46° C., some nuclei are formed which result in crystals of sodium bicarbonate being precipitated in small size, even when the further carbonating operations are conducted above 46° C. Inasmuch as the solubility of sodium bicarbonate and brine increases with increasing temperatures, it is desirable to maintain the temperature of the solution as near to 46° C. as is practical under actual operating conditions. Thus, if the temperature of the solution is permitted to exceed 76° C., the solubility of the sodium bicarbonate is so high that an unsatisfactory yield is obtained.

Since the reaction between the carbon dioxide bearing gas in the solution is exothermic and the temperature of the solution is raised by the heat of crystallization and of reaction, during the precipitation steps, about 10° C., a temperature of solution will be obtained during the crystallizing operations in excess of the most desirable values, where the temperature of solution is raised above 46° C. in the operation of concentrating the solution with bicarbonate, unless a means is provided by which between these operations, the solution may be suitably partially cooled.

In the ordinary apparatus for carbonating liquors, such a cooling operation is impractical since cooling or heating appliances placed in the towers develop hard crusts of sodium bicarbonate which quickly covers the cooling tubes.

In accordance with the present invention, I provide an apparatus in which the operation of concentrating the solution and bicarbonate may take place in a separate container than the operation of precipitating the bicarbonate from the solution and the apparatus provides a means by which the temperature of the solution, as it passes from one apparatus to the other, may be suitably changed.

In precipitating sodium bicarbonate from alkaline solutions, it is further found that when the partial pressure of carbon dioxide gas used for carbonating the solution is permitted to drop below certain values, for example, two pounds per square inch, which means that in commercial operations, five pounds per square inch is the usual minimum figure, there is a precipitation of the sesqui-carbonate of soda or trona along with the precipitation of the sodium bicarbonate. The presence of sesqui-carbonate is undesirable in sodium bicarbonate, as it precipitates small crystals, increasing the moisture content of the filtrate and interferes considerably with the proper calcination of the sodium bicarbonate to soda ash. On account of the fact that low partial pressures of carbon dioxide result in the precipitation of the sesqui-carbonate of soda, with the ordinary towers, it is generally necessary to operate them with large losses or carbon dioxide in the exit gases. While it is theoretically possible in carbonating solutions, to conduct the carbonating operation in the upper part of the tower with a low carbon dioxide partial pressure without precipitating the sesqui-carbonate of soda, since usually precipitation of bicarbonate does not take place in this part of the tower, but only a concentration of the sodium bicarbonates, in practice, it is found that, whenever the exit gases are permitted to exert only a low partial pressure af carbon dioxide, sesqui-carbonate of soda is precipitated even though in the portion of the tower in which the actual precipitation of the bicarbonate takes place, there is adequate partial pressure of carbon dioxide maintained to prevent the formation of sesqui-carbonate.

This is due it is thought to the action of the rising gases through the precipitating zone of the process carrying up into the top of the tower, small nuclei of crystals formed in the lower part of the tower which, under the low partial pressure conditions at the top of the tower, are decomposed to form nuclei of sesqui-carbonate.

By the apparatus of the present invention there is provided a means by which the portion of the solution undergoing concentration is maintained separate from the portion of solution undergoing precipitation and provides a means by which the gases which are passed from the precipitating zone of the apparatus to the concentrating zone of the apparatus can be freed from occluded crystals and foam. By the apparatus of the present invention it is therefore rendered possible to conduct the concentration of the solution in bicarbonate with a low exit partial pressure of carbon dioxide without forming of sesqui-carbonates.

The apparatus of the present invention also provides a means by which the carbonating gas may be repeatedly thoroughly redistributed through the solution to secure a more intimate contact in the solution, thereby resulting in a more rapid reaction return. The apparatus also includes means by which a thorough agitation of the gas in the solution may be caused to take place and provides a means by which especially fine gas bubbles may be produced so that by the apparatus of the present invention, there is realized nearly ten times the absorption rate obtained with the present tower apparatus.

The apparatus of the present invention together with various further objects, advantages and features of the invention will be most fully understood from a description of a preferred form or example of an apparatus which embodies the invention. For this purpose, there is hereafter described the preferred form of apparatus, the description being given in connection with the accompanying drawings, in which Figure 1 is an elevation mainly in vertical section, and Figure 2 is a section on the line 2—2 of Figure 1.

Referring to the drawings, the apparatus comprises three main closed tanks or receptacles, 1, 2 and 3. These closed tanks or receptacles each are of a height of less than 35 ft., as compared with the 60 or 90 ft. towers generally in use and in the preferred forms of the apparatus are above 20 ft. with a diameter of about 8 ft.

The carbon dioxide bearing gas enters the apparatus by the line 4 which continues past each of the receptacles of tanks 1, 2 and 3 and is provided with headers 5 at each of said tanks which extend into the tanks as shown in particular in Figure 2. The gas passes, for example, into the gas header 5, and therefrom into the tank 1, where it issues under an agitator 6. Each tank is, or the majority of the tanks are provided with similar agitating means and therefore only one is described.

While various forms of agitating means may be employed, in carrying out the broader feature of the present invention, the agitating means of the present invention illustrated is of unusual efficiency and constitutes an important feature of the apparatus. The agitator is shown as preferably comprising a perforated disc 7 or rim, over which one or more layers of the wire screen are stretched. The agitator 6 is driven through a shaft 8 axially disposed in the container and extending exteriorly thereto, where it is driven by a motor 9. The motor 9 is preferably mounted so as to be subject to synchronous vibration with the vibration of the packing glands for the shaft 8. To prevent agitation of the liquor by rotation of the gas distributors, vanes 10 are provided which may also serve to provide a bearing 11 for the shaft 8. The gases rising from the outlets of the headers 5, which extend under the wire screen, when they encounter the screen or disc 7, are broken up into very minute gas bubbles and distributed through the solution in the treating vessels very thoroughly.

It is understood that in the preferred form of the invention, each or most of the containers 1, 2 and 3 have the form of agitating means just described.

The carbon dioxide bearing gas which rises upward through the container 1 leaves it through a line 12, and enters a foam separator 13. From the separator 13, the gas passes through line 14 where it enters the tanks 2, and leaves the tanks 2 and enters the tank 3, in a similar manner.

Gas bypasses are provided to allow the operator to alter the flow of the carbon dioxide furnished to each of the reaction tanks, as may be desired. The liquor enters the system usually after being brought to the desired temperature through a line 15. It is passed from line 15 into the tank 3, which enters the tank 3 near its upper end. In entering the tank 3, the liquor preferably passes through a heat exchanger 16, where it exchanges heat with the liquor withdrawn from tank 3, in order to partially cool the liquor which is to be drawn from tank 3, and passed into tank 2. After leaving the heat exchanger 16, the solution may be further heated to the desired operating condition by heater 17. In the heater 17, for example, the solution may be heated up to above 46° C. or usually at say 50° C. In the vessel 3, the solution passes downwardly, thus passing counter-current to the uprising gas and is withdrawn from the lower end through a line 18 and passed by a pump 19 through the heat exchanger 16, hence by a line 20 into vessel 2. In the heat exchanger 16, the temperature of the solution is dropped preferably 10°, in order to compensate for the heat of reaction which takes place in the tank 2. From the tank 2, the solution is again withdrawn from the lower end by a line 21 and passed by a pump 22 into the tank 1. From the lower end of the tank 1, the solution is withdrawn through line 23. A distributing line 24 is indicated connecting the discharge lines from the tank 3 by which one or more of the tanks may be bypassed or part of the solution drawn from any one of the tanks from the system, as the operating conditions of the process may require.

Each of the foam extractors 13 is shown as provided with a line 25 for returning the separated foam to its connected tank and also with a line 26 connecting with the line 27 by which said foam may be discharged from the system when desired.

The apparatus thus described is preferably operated as follows:

The solution is passed into the treating vessel 3 after being heated by the heater 17 and at a preferred temperature of 50° C. The solution entering the line 15 is sufficiently cool so that when passing through the heat exchanger 16 will cause a 10° drop, or over, of temperature of the solution passing through line 18 to tank 2. The carbon dioxide bearing gas which enters the apparatus through line 4, preferably contains between 40 and 70 percent carbon dioxide by volume and is usually under a pressure between 35 and 50 pounds per square inch gauge.

The carbon dioxide bearing gas entering the vessel 2 is preferably under a pressure of 27 to 42 pounds per square inch and preferably contains between 48 and 50 percent carbon dioxide. The gas which enters the vessel 3 preferably contains from 8 to 18 percent of carbon dioxide at a pressure between 27 and 29 pounds per square inch. The exit gases from the last treating vessel will contain a small amount of carbon dioxide gases which may be as low as 2 to 5 percent by volume.

While the particular form of the invention herein described is well adapted to carry out the objects of the invention, it is understood that various modifications and changes may be made in the details of the apparatus without departing from the invention, and the invention includes all such changes as come within the scope of the appended claims.

I claim:

1. A carbonating apparatus comprising means for containing a solution, means connected therewith for contacting a solution therein with carbon dioxide bearing gas while obtaining a low partial pressure of carbon dioxide in the exit gases, a second container, means for passing the solution from the first container to the second container, means connected with said second container for passing carbon dioxide bearing gas to the solution therein under conditions of high partial pressure of carbon dioxide to precipitate sodium bicarbonate, means for passing the exit gases from said second container to said first container, means for separating foam from said gases as they pass between said containers, and means for cooling the solution as it passes between said containers.

2. A carbonating apparatus comprising means for containing a solution, means connected therewith for contacting the solution therein with carbon dioxide bearing gas while obtaining a low partial pressure of carbon dioxide in exit gases, a second container, means for passing the solution from the first container to the second container, means connected with said second container for passing carbon dioxide bearing gas to the solution therein under conditions of high partial pressure of carbon dioxide to precipitate sodium bicarbonate, means for passing the exit gases from said second container to said first container, and means for cooling the solution as it passes between said first container to said second container by indirect contact with a feed solution.

3. A carbonating apparatus comprising means for containing a solution, means connected therewith for contacting the solution therein with carbon dioxide bearing gas while obtaining a low partial pressure of carbon dioxide in exit gases, a second container, means for passing the solution from the first container to the second container, means connected with said second container for passing carbon dioxide bearing gas to the solution therein under conditions of high partial pressure of carbon dioxide to precipitate sodium bicarbonate, means for passing the exit gases from said second container to said first container, means for cooling the solution as it passes between said first container to said second container by indirect contact with a feed solution, and means for heating the solution entering said first container after passing through said cooling means.

4. A carbonating apparatus comprising means for containing a solution, means connected therewith for contacting the solution therein with carbon dioxide bearing gas while obtaining a low partial pressure of carbon dioxide in exit gases, a second container, means for passing the solution from the first container to the second container, means connected with said second container for passing carbon dioxide bearing gas to the solution therein under conditions of high partial pressure of carbon dioxide to precipitate sodium bicarbonate, means for passing the exit gases from said second container to said first container, means for cooling the solution as it passes between said first container to said second container by indirect contact with a feed solution, means for separating foam from said gases as they pass between said containers, gas outlets for the gas entering said containers, and rapidly rotating screens disposed above said outlets, and vanes in said containers operating to prevent the rotation of said screens from rotating the solutions in said containers.

Signed at Los Angeles, California, this 9th day of January, 1929.

HEINZ H. CHESNY.